United States Patent [19]
Albertazzi

[11] 3,939,567
[45] Feb. 24, 1976

[54] METHOD AND RELEVANT APPARATUS FOR THE INDIRECT MEASUREMENT OF THE LONGITUDINAL DEVELOPMENT OF CURVED SEATS OR GROOVES IN MECHANICAL WORKPIECES

[75] Inventor: Gastone Albertazzi, Bologna, Italy

[73] Assignee: Finike Italiana Marposs, Soc. In Accomandita Semplice di Mario Possati & C., Bentivoglio, Italy

[22] Filed: Aug. 28, 1974

[21] Appl. No.: 501,255

[30] Foreign Application Priority Data
Sept. 4, 1973 Italy.................................. 3489/73

[52] U.S. Cl.............. 33/143 L; 33/178 E; 33/174 L
[51] Int. Cl.².......................................... G01B 7/28
[58] Field of Search .......... 33/143 L, 147 N, 178 E, 33/178 R, 148 H, 174 L, 174 R

[56] References Cited
UNITED STATES PATENTS

| | | | |
|---|---|---|---|
| 979,248 | 12/1910 | Ayers.............................. | 33/174 R |
| 1,417,703 | 5/1922 | Waffenschmidt................. | 33/174 R |
| 2,369,909 | 2/1945 | Mestas............................. | 33/178 E |
| 3,221,544 | 12/1965 | Gunkel............................. | 73/67.8 |
| 3,420,222 | 1/1969 | Noe et al......................... | 33/148 H X |
| 3,479,744 | 11/1969 | Howland et al................. | 33/174 R X |

OTHER PUBLICATIONS
American Machinist, Dec. 2, 1948, p. 105, "Vernier Caliper Measures Radii of Partial Sections," by Clifford Bower.

*Primary Examiner*—Richard E. Aegerter
*Assistant Examiner*—Michael H. Thaler
*Attorney, Agent, or Firm*—Stevens, Davis, Miller & Mosher

[57] ABSTRACT

A method and apparatus for the measurement of the distance between two points along a circular arc having an unknown radius in which there is a measuring signal generated responsive to the distance between the two points along a straight line passing through them and a measurement of the bending radius of the arc effected on the basis of the distance of a third point on the arc from a straight line joining a fourth and fifth point on the arc. The apparatus includes a support for the arc of the material being measured, a first measuring head for measuring the distance along a straight line between the ends of the arc, a second measuring head provided with at least three feelers with one of the feelers being mobile with regard to the other two, for detecting the arc bending and a processing and indicating unit connected with the first and second measuring heads to determine the longitudinal development.

9 Claims, 3 Drawing Figures

METHOD AND RELEVANT APPARATUS FOR THE INDIRECT MEASUREMENT OF THE LONGITUDINAL DEVELOPMENT OF CURVED SEATS OR GROOVES IN MECHANICAL WORKPIECES

This invention relates to a method and relevant apparatus for the indirect measurement of the longitudinal development of curved seats or grooves in mechanical workpieces. In particular, the invention relates to the precision measurement of the length of circular seats for the side seals of the rotors of Wankel engines.

It is known that in the rotors of Wankel engines there are seats for seals and that the sealing of the seals is an essential requirement for the good working of such engines. Therefore it is indispensable, among other things, to check that the seals and the seats have a suitable longitudinal development.

The measurement of the geometrical sizes of mechanical workpieces are usually carried out by means of comparators of various types, for instance comparators including mobile arms associated with position transducers and fitted with feelers which are brought into touch with the workpiece.

These known comparators are adapted to measure the distance between two points according to the straight line passing through them, but they cannot indicate the distance between the points according to a non-rectilinear joining line. Therefore such comparators cannot check the length of the curved seats of the side seals of Wankel rotors in case the bending radius of the seats may be different from the theoretical value.

It is therefore an object of the present invention to provide a method for measuring the distance between two points according to a joining circular arc of an unknown radius.

Another object of the present invention is to provide an apparatus to embody the method which is adapted to measure precisely and quickly the length of pieces, grooves or seats, in particular seats for side seals of Wankel rotors, developed according to a circumferential arc of an unknown radius.

According to the present invention, the method for measuring the distance between two points according to a joining circular arc of an unknown radius, in particular for measuring the developmental length of seats or grooves obtained in mechanical workpieces, foresees measuring the distance between the two points according to the straight line passing through them and measuring the bending radius of the arc. The second measurement being effected on the basis of the distance of a third point of said arc from the straight line joining a fourth and fifth point of the same arc, the development of the latter being obtained by processing the two measurements.

An apparatus for embodying the method, adapted to measure the length of seats of grooves developed according to a circumferential arc, includes first measuring means to detect the distance, according to a straight line, between the ends of the seat and second measuring means formed by a base or segment of a known length adapted to cooperate with two points of the seat and by a measuring device associated with the base and having a moving element adapted to cooperate with another point of the seat. The measuring device is adapted to measure the distance of said last point from the line joining the other two points. The apparatus further includes processing and indicating means adapted to process the output signals of the first and second measuring means, to provide the indication of the unknown length.

The invention will be described in more detail by reference to the attached drawings given by way of a non-limiting example in which equal or equivalent parts present the same reference indexes and in which.

Figure 1:
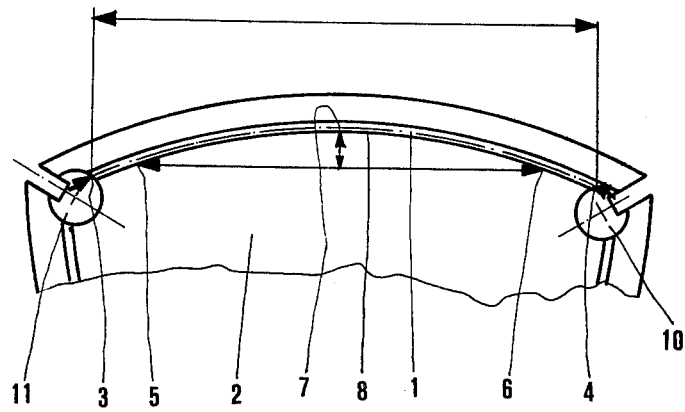
FIG. 1 is a partial side view of a detail of a Wankel rotor illustrating the measuring problem and a preferred embodiment of the method according to the present invention.

With reference to FIG. 1 the method according to the invention allows one to measure the distance of the grooves with circular bending 1 obtained in a Wankel rotor 2 by the measurement of two quantities; the distance between the ends of groove 1 marked by 3 and 4 and the height of the arc defined by the two points 5, 6 on the side 8 of the groove, i.e. the distance of point 7 from the line joining the two points 5, 6. The distance between the two points 5, 6 is kept unchanged for all successive measurements, therefore by simply processing the measure of the height it is possible to obtain the value of the bending radius of groove 1. Hence, with the distance between ends 3 and 4 being known, the length of the arc defined by the ends themselves can be easily determined.

Figure 2:
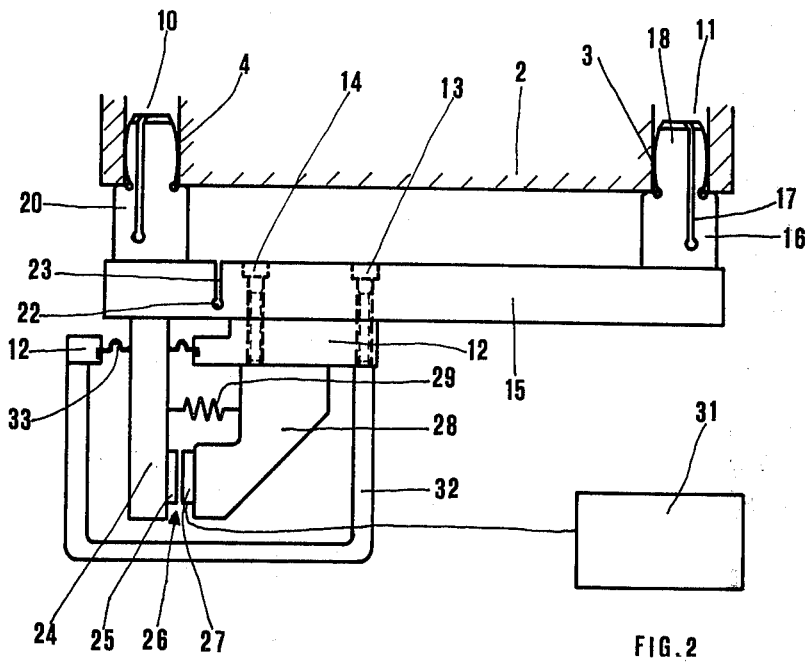
FIG. 2 is a side view of a device forming a part of the apparatus according to a preferred embodiment of the present invention serving to measure the distance, according to a straight line, between the ends of a seat for a side seal of a Wankel rotor.

FIG. 2 illustrates a device for measuring the distance between the ends of groove 1 obtained in Wankel rotor 2. Only ends 3 and 4 of this groove which come to cylindrical hollows 10 and 11 can be seen in the Figure.

The measuring device includes a support element 12 with which an arm 15 is connected through screws 13, 14. With an end of this arm 15 there is rigidly connected an element 16 terminating in a cylindrical convex section 18 with a radius slightly longer than that of the corresponding hollow 11.

In element 16 is obtained a number of longitudinal slots making its section capable of being deformed. In FIG. 2 there is marked by 17 one of these slots, whose function is to allow the insertion of element 16 in the hollow and to ensure the contact between the relevant walls.

An element 20, quite similar to element 16, is integral with the other end of arm 15.

In arm 15, at an intermediate position between the connecting part with support 12 and the end to which element 20 is fixed, are hole 22 and slot 23 which reduce its section to a very thin flexible leaf spring to form a fulcrum for the end of the arm bearing element 20.

At the end of arm 15 bearing element 20 there is also integral therewith an arm 24 supporting moving armature 25 of an electric position transducer 26. A fixed armature 27 is supported by an element 28 integral with support 12; a spring 29 is interposed between the two elements 24 and 28 supporting armature 25, 27 of the transducer. The output signal of the transducer 26 is brought to a processing and indicating unit 31.

Transducer 26 is contained in a protection box 32 fixed to support 12; the sealing around arm 24 is ensured by a ring-shaped elastic seal 33 fixed outside to frame 12 and inside to arm 24 which is capable of being deformed following the small displacements of arm 24 itself.

Figure 3:
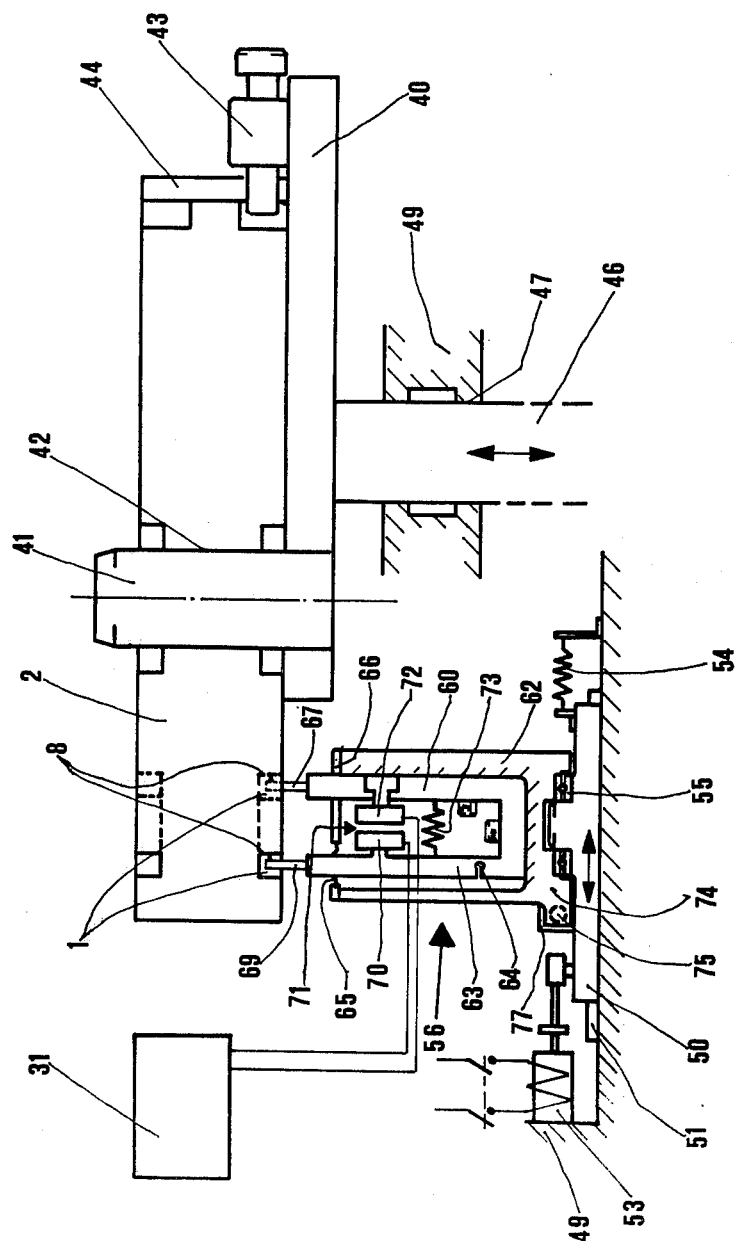
FIG. 3 is a partial sectional side view of another device forming a part of the apparatus of FIG. 2 and serving to measure the camber of an arc of the seat.

FIG. 3 shows a device adapted to measure the height of arc 5 – 6 of FIG. 1.

To make illustration easier the value of the height was magnified.

Rotor 2 is supported by a support 40 movable in a vertical direction, on which it is centered by means of a pivot 41, which cooperates with axial hole 42 of the rotor itself, and by means of a bolt 43 that passes through walls 44 of a corner groove and ensures the exact angular positioning of the rotor.

In turn, support 40 is supported by a shaft 46 which can slide axially on cylindrical guides 47 obtained in a supporting frame 49.

Rotor 2 is loaded on support 40 while support 40 is in its highest position and is locked by bolt 43 in the exact position.

The measuring device includes a slide 50 sliding relatively to frame 49 on a guide 51. An electromagnet 53, when energized, keeps the slide in a predetermined position. When electromagnet 53 is de-energized, slide 50 moves away from this position under the action of spring 54, stretched between slide 50 and frame 49.

A measuring head 56 is mounted on the slide through a bearing 55. The head comprises three arms provided with feelers.

Two arms are stationary with regards to a support 62 which constitutes the frame of the head.

FIG. 3, where the head is represented sectioned along a vertical plane, shows only a stationary arm 60 with relevant feeler 67. The other stationary arm is parallel to arm 60 and is symmetrical about the cutting plane.

The two feelers 67 define a segment, or base, having a known length, whose ends are adapted to cooperate with two points of the groove 1, as it will be explained hereinafter.

On the contrary, the third arm 63, provided with a feeler 69, is free to carry out limited rotations, over a plane intermediate with respect to the other two arms, about a fulcrum 64 which is also obtained by means of a hole and a slot reducing the section of the arm to a thin leaf spring.

A resilient seal 65 is interposed between arm 63 and front section 66 of the head to provide sealing while allowing limited motion to arm 63.

An armature 70 of an electric position transducer 71 is fixed on moving arm 63 while another armature 72 is integral with the stationary arms 60. A spring 73 urges moving arm 63 toward stationary arms 60.

A projecting part 74 protrudes from the outer surface of head 56, at the end near slide 50, perpendicular to the latter.

The two opposite faces of projecting part 74 constitute abutment surfaces for relevant ends of two springs, symmetrically arranged about the projecting part itself, the other ends of the springs cooperating with reference elements integral with the slide. Only a reference element 77 and a spring 75, represented by a dashed line, are visible in FIG. 3.

Under conditions of rest the two springs 75 keep projecting part 74 in a central position with respect to the two reference elements 77 thus defining a reference angular position for the whole head 56 (then the feeler 69 lies in the plane of the drawing).

Measurement transducer 71 is connected with processing and indicating unit 31.

The operation of the measuring apparatus of FIGS. 2 and 3 is as follows:

Rotor 2 is loaded and positioned on support 40.

Then not shown operating means lower axially shaft 46 with support 40 bringing rotor toward the measuring devices of FIGS. 2 and 3.

These devices are arranged so that they can simultaneously carry out the relevant measurement operations, on the same groove 1 of the rotor.

The arrangement of the apparatus is such that as rotor 2 reaches the measuring devices, hollows 10, 11 (FIG. 2) are exactly aligned with elements 16 and 20 and groove 1 is aligned with feelers 67 and 69.

As the advancement of the rotor goes on, elements 16 and 20 enter the relevant hollow, this being made easier by longitudinal slots 17 which allow the section of the same elements to fit in that of the hollows.

In the meanwhile also feelers 67 and 69 are inserted in the groove and at this moment the axial lowering of the shaft 46 terminates.

The measure of the distance between the ends 3, 4 of groove 1 is immediate. In fact, since element 16 is stationary with respect to support 12, element 20 fits to a distance of ends 3 and 4, larger or smaller than the nominal value by slightly rotating about fulcrum 22 in order to enter hollow 10. Together with element 20 also arm 24, which is integral with it, rotates and in this way armature 25, carried by arm 24, approaches or moves away from fixed armature 27.

The contact between the wall of hollow 11 and element 16 takes place approximately in the same section of hollow 11, because element 16 is convex. This happens also when the distance between ends 3 and 4 differs considerably for the successive grooves.

The signal provided by transducer 26 reaches unit 31, where the measure can be memorized for a time sufficient for the device of FIG. 3 to carry out the measure of the arc height.

With reference to FIG. 3, when rotor 2 stops advancing a suitable signal causes de-energization of electromagnet 53 which until then has kept slide 50 in a determined position such as to render easy the entry of feelers 67, 69 into groove 1.

No longer attracted by the electromagnet 53, the slide 50 moves on the right, attracted by spring 54, till the two stationary feelers 67 contact the internal side 8 of groove 1.

If initially the contact takes place with only one of the two feelers 67 the slide 50 keeps on moving and, in the same time, the whole measuring head 56 rotates on the bearing 55 pivoting around the contact point, between the groove 1 and the first feeler 67, until the second feeler 67 contacts side 8 of groove 1. At this point, the slide 50 stops and the feelers 67 contact steadily rotor 2 under the action of spring 54.

Then, also feeler 69 is steadily in touch with side 8 owing to the action of spring 73 acting on arm 63. Therefore the two stationary feelers 67 are in the position indicated, in FIG. 1, by reference characters 5 and 6, while the mobile feeler 69 is in the position 7.

The transducer 71 supplies a signal which depends on the distance of point 7 from the line joining points 5 and 6, and therefore on the bending radius of groove 1.

Unit 31 processes this signal together with the one dependent on the value of the distance between the ends of the groove 1 and supplies, as a final indication, the longitudinal development, along the circumference, of the groove.

After carrying out in this way the measurement of groove 1, the electromagnet 53 is energized and, overcoming the force of spring 54, takes back slide 50 into the initial reference position. Shaft 46 moves upwardly with respect to the frame 49 thereby moving away rotor 2 from feelers 67, 69.

The measuring head 56, which has slightly rotated to let both stationary feelers touch the side of groove 1, takes again the right angular position owing to two springs 75 which have been loaded, one compressed and the other lengthened, by the displacement of projecting part 74 integral with the head.

Now the springs 75 force projecting part 74 into a position of rest, intermediate with regards to the reference elements 77, as head 56, no longer pushed against rotor 2 is free to rotate on bearing 55.

Thereafter rotor 2 is unlocked from bolt 43, and rotated 120° around the pivot 41, presenting in this way to the measuring devices a new groove. Later on, rotor 2 is locked again by bolt 43.

From this moment, all the measuring operations are repeated. By turning over the rotor 2 it is possible to measure the grooves of the opposite side.

Several variations may be made in the described embodiments. For example, the two measuring devices of FIG. 2 and FIG. 3 may act subsequently, when room dimensions make it necessary, and through suitable memory circuits the two measures may be processed.

Instead of making the rotor 2 go adhead towards the measuring devices, the latter may be displaced towards the former. With reference to FIGS. 1 and 3, feeler 69 instead of acting on the symmetry plane of feelers 67, may be also positioned on a different plane (parallel to the precedent one and at a known distance from it) which may not intersect the segment joining the feelers 67.

Also in this case the two stationary feelers 67 and the mobile one 69 locate three points of a circumference and therefore it is possible to obtain its bending.

To measure the length of the segment joining the ends of the seat or groove a device, different from the one shown in FIG. 2, may also be used.

What is claimed is:

1. An apparatus for making geometric measurements on a groove defined in a workpiece by two side surfaces having a part-circular profile of unknown bending radius, comprising:
    a frame;
    a workpiece support coupled to the frame;
    a slide movable on the frame;
    a measuring head mounted on said slide at a side of the workpiece, the measuring head including: an oscillating support mounted on the slide; two adjacent feelers fixed to said support, for contacting two points on one side of the groove; a third feeler mounted on the support and movable in a direction substantially perpendicular to a line passing through said fixed feelers, for contacting a third point on said side of the groove; and position transducer means coupled to said fixed feelers and movable feeler to provide a signal responsive to the distance between the movable feeler and said line;
    means acting on said slide for displacing it in a determined direction to bring said fixed and stationary feelers towards said side of the groove; and control means coupled to said slide for displacing it from a measuring position where said fixed and movable feelers contact said side of a groove to a determined rest position for the introduction of the stationary and movable feelers into the groove.

2. The apparatus according to claim 1, wherein said means acting on said slide comprises means coupled between the slide and said frame for displacing the slide and reaching said measuring position.

3. The apparatus according to claim 2, wherein said oscillating support comprises a casing pivoted on said slide and reference means adapted to define an angular rest position of the oscillating support.

4. The apparatus according to claim 3, wherein said workpiece support is movable to displace the workpiece towards and away from said measuring head.

5. An apparatus for the measurement of the longitudinal development between the ends of a groove defined in a workpiece by two side surfaces having a part-circular profile of unknown bending radius, comprising:
    a frame;
    a support, carried by the frame, for supporting the workpiece;
    a first measuring device arranged at a side of the workpiece, said measuring device including: a first measuring element for contacting the workpiece at one end of the groove; a second measuring element for contacting the workpiece at the other end of the groove; and first position transducer means coupled to said elements for providing a signal responsive to the distance between the ends of the groove along the straight line passing through said ends;
    a slide carried by the frame;
    a second measuring device carried by said slide at a side of the workpiece, the second measuring device including: a first member comprised of two feelers stationary with respect to each other; a second member comprised of a third feeler movable in a transversal direction with respect to the line passing through said stationary feelers; an oscillating support, carried by said slide, for supporting said first member and second member and permitting said stationary and movable feelers to contact three relevant points on a side of said groove; and second position transducer means coupled to said movable and stationary feeelers to provide a signal responsive to the distance between the movable feeler and said line passing through the stationary feelers;
    thrusting means coupled between said frame and the slide for displacing the slide to bring the stationary and movable feelers towards said side of the groove;
    a retracting device coupled to said slide for displacing it to a rest position adapted for inserting the stationary and movable feelers into said groove; and
    processing means for processing the signals provided by the first and second transducer means to obtain the longitudinal development of the groove.

6. An apparatus for measuring the longitudinal development of seats for side seals of a Wankel rotor, comprising:
    a frame;

a first support, carried by the frame, for positioning and supporting said rotor;

a first measuring head arranged at a side of the rotor, said measuring head including two measuring elements for contacting the rotor at the ends of a seat for a side seal and a position transducer coupled to said elements for providing a signal responsive to the distance of said ends along a straight line;

a slide mounted on the frame;

a second support pivotally mounted on said slide;

a second measuring head carried by said second support, said second measuring head including: two adjacent contact members fixed to said second support, for contacting two points on a side wall of said seat; a third contact member movably mounted on the second support for contacting a third point on said side wall; and a position transducer coupled to said fixed and movable contact members for providing a signal responsive to the distance of said third point from the straight line passing through said two points; means acting on said slide for displacing it in a determined direction to bring said fixed and movable contact members towards said side wall of the seat; control means coupled to said slide for displacing it from a measuring position where said fixed and movable contact members contact said points to a rest position for making easier the introduction of the fixed and movable contact members into said seat; and processing means for processing said signals provided by said measuring heads to obtain the longitudinal development of the seat.

7. The apparatus according to claim 6, further comprising reference elements coupled to said second support for defining an angular rest position of the second support for making easier the introduction of the fixed and movable contact members into said seat.

8. The apparatus according to claim 7, wherein said first support is movable from a position for the loading of the rotor to a measurement position.

9. The apparatus according to claim 8, wherein said first support comprises reference means for selectively positioning the rotor in different positions to permit the measurement on the different seats of the rotor by said first and second measuring head.

* * * * *